United States Patent
Schwuttke et al.

(10) Patent No.: US 6,222,547 B1
(45) Date of Patent: *Apr. 24, 2001

(54) MONITORING AND ANALYSIS OF DATA IN CYBERSPACE

(75) Inventors: Ursula M. Schwuttke, Arcadia; Robert Angelino, LA, both of CA (US)

(73) Assignee: California Institute of Technology, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,769

(22) Filed: Feb. 7, 1997

(51) Int. Cl.[7] .................................... G06T 15/00
(52) U.S. Cl. .......................... 345/419; 345/440; 345/356
(58) Field of Search .................................. 345/440, 419, 345/356

(56) References Cited

U.S. PATENT DOCUMENTS

| | | | |
|---|---|---|---|
| 5,555,354 | * | 9/1996 | Strasnick et al. .................... 345/427 |
| 5,751,289 | * | 5/1998 | Myers .................................... 345/419 |
| 5,751,931 | * | 5/1998 | Cox et al. ............................. 345/440 |
| 5,835,094 | * | 11/1998 | Ermel et al. .......................... 345/355 |
| 5,838,973 | * | 11/1998 | Carpenter-Smith et al. ........ 395/701 |

OTHER PUBLICATIONS

Grinstein, G. et al., "Visualization for Knowledge Discovery", International Journal Intelligent Systems, vol. 7, pp. 637–648, 1992.*

Flanagan, "Cyberspace meets Wall Street", Forbes, pp. 164–168, 1992.*

Advertisement for PV–Wave Point & Click from Precision Visuals Inc., 1991.*

* cited by examiner

*Primary Examiner*—Mark R. Powell
*Assistant Examiner*—Motilewa Good-Johnson
(74) *Attorney, Agent, or Firm*—Fish & Richardson P.C.

(57) ABSTRACT

Information from monitored systems is displayed in three dimensional cyberspace representations defining a virtual universe having three dimensions. Fixed and dynamic data parameter outputs from the monitored systems are visually represented as graphic objects that are positioned in the virtual universe based on relationships to the system and to the data parameter categories. Attributes and values of the data parameters are indicated by manipulating properties of the graphic object such as position, color, shape, and motion.

38 Claims, 11 Drawing Sheets

MENU-DRIVEN INTERFACES

CYBERSPACE-DRIVEN INTERFACES

COMMAND-DRIVEN INTERFACES

GUI-DRIVEN INTERFACES

CMS Magellan: DSS Monitor Data

CPU: 93-253/16:26:02   SCE: 93-253/16:09:33   RC: 09/10/93-16:20:38   MSN: 7

ERT: 93-253/16:20:51   SCLK (DEC): 02277540.75   SCLK (HEX): 22C0A4:4   BROADCAST ID: MGNTISB   DSS: 15

| CHANNEL | TYPE | NAME | ERT | ENGR UNIT | DATA NUM | YELLOW/RED ALARM INFO |
|---|---|---|---|---|---|---|
| M-0080 | U | BBA SNR 1 | 93-253/16:30:05.000 | 5.0859 | 779 | 5.100000, 8.200000/3.300000, 10.000000 |
| M-0034 | S | RECID CORCTD | 93-253/16:20:51.000 |  | OFF-00 |  |
| M-0027 | F | RCVA AGG A | 93-253/16:30:05.000 | -145.96 | 222/0 | -140.000000, -120.000000/-150.000000, -100.0* |
| M-0040 | F | REM 4 TEMP 2 | 93-253/16:20:51.000 | 81.209 | 229 | 0,0/0,0 |
| M-0032 | F | CMI CORCTD | 93-253/16:20:52.000 | 123.98 |  | 15, 50/0,0 |

DISMISS   PRINT   HELP

MONITORING AND ANALYSIS OF DATA IN CYBERSPACE

ORIGIN OF INVENTION

The invention described herein was made in the performance of work under a NASA contract, and is subject to the provisions of Public Law 96-517 (35 USC 202) in which the Contractor has elected to retain title.

FIELD OF THE INVENTION

This invention relates to a data monitoring and analysis system. More specifically, the present invention defines a user interface providing a three dimensional representation of complex data, data relationships and system status.

BACKGROUND AND SUMMARY OF THE INVENTION

The operation of many complex systems requires an operator to monitor status of the system by assimilating a large amount of real-time status data received from various system components. Complex systems of this type include spacecraft operations, industrial plants, financial trading activities, and hospital monitoring of medical data from patients. All of these systems require important decisions to be made, sometimes quickly, in response to a myriad of data. Once the status of the system or the nature of a problem is understood, the system operator takes appropriate actions to implement decisions or to remedy the problem. In extreme cases, these actions may save the system from serious undesirable consequences. It is very important that this complex data be presented clearly and concisely so that the operator can obtain any information needed for diagnostic purposes as easily and quickly as possible.

Existing data display systems often use numerical or two-dimensional displays which require the operator to interpret and analyze the data and its relationship to other data. Some of the features of these kinds of displays are illustrated in FIGS. 1a–1c, which graphically illustrate how the composition of total information conveyed to a user varies over time for various interface types. The total information conveyed in these graphs is equal to the amount of "navigation data" plus the amount of "destination data". Navigation data is defined as that class of information that orients a user in time, space, location and direction; informs the user of progress in relative and/or absolute terms; and that contains addresses, instruction to proceed, and/or warnings not to proceed. Destination data is defined as that class of information that satisfies the user's desire for information, for example, by answering a question.

Typically, the goal of a user interface is to maximize the volume of available destination data while minimizing the delay in making the destination data available. As shown in FIG. 1a, an operator of a command-driven interface has very little destination data available initially and spends roughly half of the time traversing alphanumeric menus ("navigation data") to get to the desired data display ("destination data").

An operator of a menu-driven interface (FIG. 1b) typically can access a larger volume of destination data somewhat faster after first navigating through one or more menu items. However, the operator can become frustrated upon encountering several layers of sub-menus before being able to access the bulk of the destination data. This results in a drop-off (at time D in FIG. 1b) in the amount of available destination data.

In a graphical user interface ("GUI"), the operator traverses through various windows and screens to get at the destination data in a step-wise fashion as illustrated in FIG. 1c. Certain destination data may not be accessible until the operator has stepped through a number of windows, thus diminishing the operator's efficiency. These graphs were presented by Michael Benedikt in the article "Cyberspace: Some Proposals" which appears in the book *Cyberspace: First Steps*.

These shortcomings of command, menu and GUI driven interfaces are magnified in data intensive operational environments of the kind described above. The inventors recognized a need in these environments for an improved user interface that makes more information available in less time. Destination data is one example of such data. These problems are well illustrated in the example of spacecraft operation control.

During a typical spacecraft mission, data parameters from many different domains are monitored and/or analyzed in real time to ensure that the spacecraft and its instruments are working properly. A mission control site receives this data from the spacecraft by telemetry. In this setting high volumes of data are received at very frequent intervals. Monitoring this data poses a daunting and complex challenge. This is especially true when multiple spacecraft missions are being monitored simultaneously by a single system.

Early spacecraft data monitoring systems employed a panel of discrete, hardwired lights, each light corresponding to an individual data parameter. A team of human operators (e.g., flight controllers or analysts) monitoring the spacecraft mission, would continually observe the various lights to ensure that the spacecraft and its instruments were operating properly. A trained operator could readily determine whether error or alarm conditions were present simply by scanning the panel for the appropriate color light. For example, a green light might mean that a particular data parameter was within normal ranges, while a red light might indicate that acceptable levels for that parameter had been exceeded. The lights provided a dramatic and immediately comprehensible indication of system status. This early light-panel monitoring system hence had the advantage of providing the operator with an intuitive sense of system health.

As spacecraft and their associated instruments became more sophisticated, light-panel monitoring systems became inadequate to handle the volume and complexity of the telemetry data that was being collected. Light-panel systems also were difficult and labor-intensive to adapt for new types of telemetry data that changed with each mission.

The next generation of data monitoring systems attempted to solve this problem. A computer system (for example, a work station) received telemetry data and displayed it in textual (i.e., alphanumeric) form on the display monitor. FIG. 2 shows a sample output of a typical text-based data monitoring system. The necessarily high volume of telemetry data causes the display screen to become cluttered and difficult to read. An operator relying on the text-based monitoring system in FIG. 2 is required to study and understand large amounts of alphanumeric information to accurately monitor the health of spacecraft. That task requires extensive training and considerable diligence on the operator's part. Even with sufficient training, using a text-based system to monitor data is fatiguing for the operator and frequently results in missed alarm conditions or slow responses to alarm conditions.

In short, text-based data monitoring systems do not generate easily recognizable indicators of changes in system status. Rather, a change in system status (even a potentially catastrophic one) is signalled merely by changing one or more alphanumeric characters to other lphanumeric characters on a display screen. The screen typically contains several hundred such alphanumeric characters, and even the most vigilant human operator can occasionally overlook an important alarm condition. Thus, there is a need for a system that can present a large amount of information to a user in a way that is readily understandable and in a way that conveys important conditions in a very noticeable way.

The data monitoring system of the present invention uses a three dimensional simulated space representation, (sometimes called a "cyberspace representation,"), to interface with, and to communicate complex, real-time information to an operator. A cyberspace representation utilizes various elements (e.g., time, space, sound, travel, and user presence in the computer environment) to convey information to the operator. The root word "cyber" comes from the Greek word "kybernan" which means "to steer or control." Literally, cyberspace means to steer or control space.

The cyberspace data monitoring system of the present invention may be implemented in conjunction with artificial reality or virtual reality systems. The cyberspace interface of the invention provides a graphically-oriented user interface where the operator is figuratively positioned within the user interface environment. The invention uses a visual representation to communicate information to the user. The interface appears to the user as a perspective view of a three-dimensional space from a particular vantage point. The user may move around within the three dimensional space, and thus change his view through manipulation of a cursor input device. As the user navigates through the three-dimensional space, the display changes to reflect the operator's new position within the space. This movement may reveal objects that were not previously visible from the operator's prior vantage point.

The use of this cyberspace representation allows the present data monitoring system to realize a "textless" or "minimal text" display that allows a human operator to assimilate and comprehend large quantities of data at a rate and to a degree much greater than previously possible. This is because the user interface of the invention is in a form similar to that used to comprehend real-world events. Rather than representing information in the form of multiple rows and columns of alphanumeric characters, data is depicted in the form of graphic symbols or objects which are positioned within a three-dimensional virtual universe. The respective dimensions of the virtual universe correspond to categories of information from various domains. For example, in one embodiment of the invention, these categories may include: the various spacecraft missions being monitored, various user-defined categories of data parameters that are relevant to the application, attitude control system, propulsion, Alarm Log and User-Defined. The Alarm Log category records all anomalous data values until they are acknowledged by the user. The User-Defined category allows copies of data values from any other category to be grouped together. A third dimension may correspond to certain user-defined alarm limits of state value for each of the data parameter categories.

The shape, motion, position, color and behavior of the graphic symbols are configured to convey an extensive amount of information about the current values of the data parameters to the human operator in an easily understandable and instantly recognizable manner.

FIG. 1d shows the Total Information to User graph for a cyberspace-driven interface. A cyberspace-driven interface does not require an operator to enter alphanumeric commands or to traverse menu items or windows before destination data is available. Rather, as illustrated in FIG. 1d by the three exemplary curves of cyberspace-driven interfaces, the operator has essentially instantaneous access to a considerable amount of destination data. This results in a greater amount of usable information being conveyed to the operator in less time.

Another advantage provided by the cyberspace-driven system of the invention is that its visual abstraction of data allows an operator to assess the qualitative status of the various spacecraft with not much more than a mere glance at the display screen. For example, in one embodiment of the cyberspace system of the invention, information about alarm severity is conveyed by the height of a pole extending from the graphical objects. In a text-based system, in contrast, severity information may be obtained only by manually referring to the alphanumeric alarm limits of the parameters of interest.

The cyberspace system also permits more data to be displayed on the screen at any one time. Only a part of one screen is used in the cyberspace system (in contrast to the multiple screens that are used for text-based systems), hence all of the telemetry data for an entire system can be displayed unambiguously in a fraction of the screen real-estate that has been previously required.

Yet another advantage of the cyberspace data monitoring system is that it allows multiple systems to be monitored simultaneously, and further allows related data parameters to be grouped (and re-grouped) by the operator logically in space. Thus, the cyberspace system is easily tailored to the specific needs of a particular system or to the preferences of a particular operator.

Standard computer graphics manipulation techniques are used to facilitate navigation through this virtual universe of data to alter the relative vantage point within the universe. Hence the operator may move between different monitored systems (such as different spacecraft missions) to inspect a particular data parameter or group of parameters in more detail than might be possible at a different vantage point within the universe.

The cyberspace data representation provided by the invention eliminates the need for an operator to read large volumes of textual material in order to determine system status. Rather, merely by scanning the attributes of the graphic symbols displayed on the screen, an operator gleans an intuitive understanding of the system status that extends far beyond the knowledge that could be imparted by a visual inspection of either a light-panel display or a text-based display.

Other advantages of the cyberspace data monitoring system include the following: an operator is able to recognize impending alarm conditions earlier and with greater reliability due to the intuitive nature of the cyberspace interface; operators may be trained faster and with greater efficiency; a plurality of sub-systems can be operated as a single system instead of as collections of sub-systems because the status of the entire system can be understood from one display; fewer operators may be required by enabling a single operator to effectively monitor larger components of a system; operators can become aware of problem situations before actual alarms occur and without needing to manually assess collected trend data; and operations differences between non-identical systems can be minimized.

BRIEF DESCRIPTION OF THE DRAWINGS

These and other features and advantages of the present invention will become evident from the detailed description set forth hereafter with reference to the accompanying drawings.

FIG. 8 is a pop-up display from the cyberspace data monitoring system of the present invention;

DETAILED DESCRIPTION

Figure 1B:
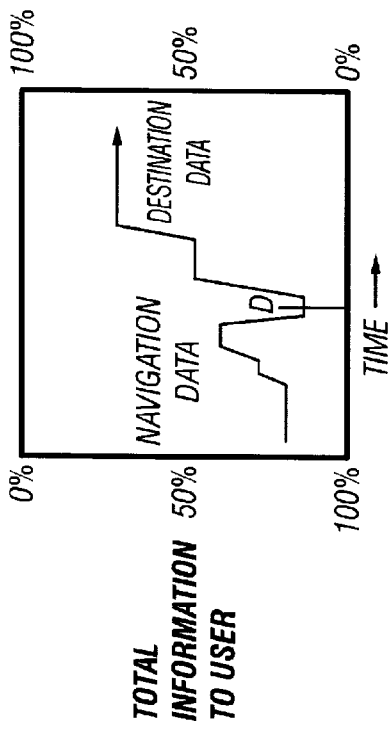
FIGS. 1a–1d are graphs of Total Information to User versus Time for various interface types.
Figure 1D:
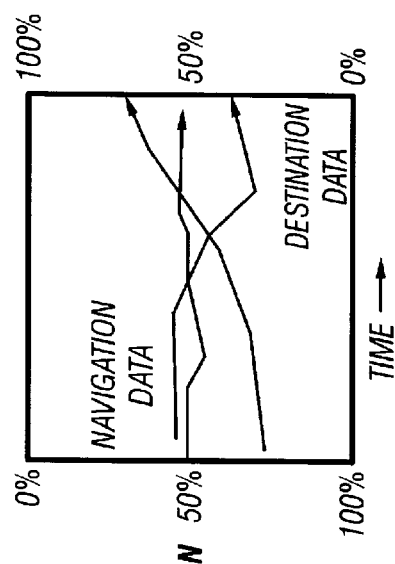
Figure 1A:
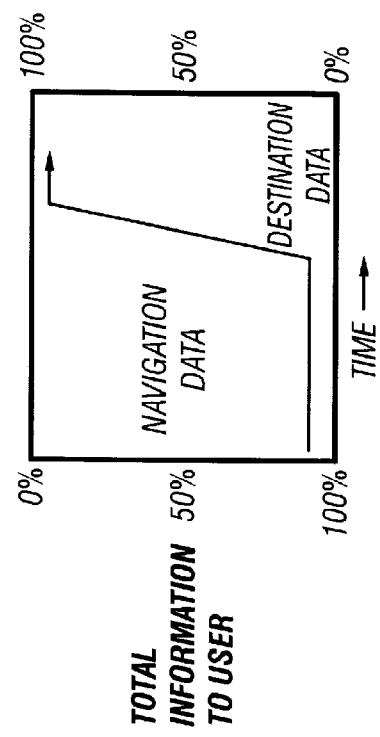
Figure 1C:
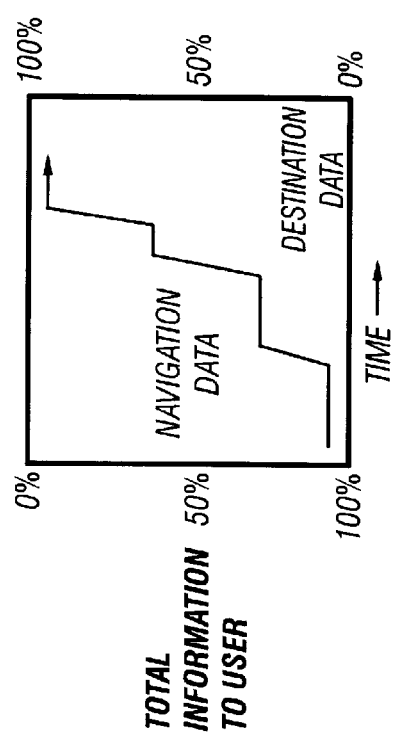
Figure 2:
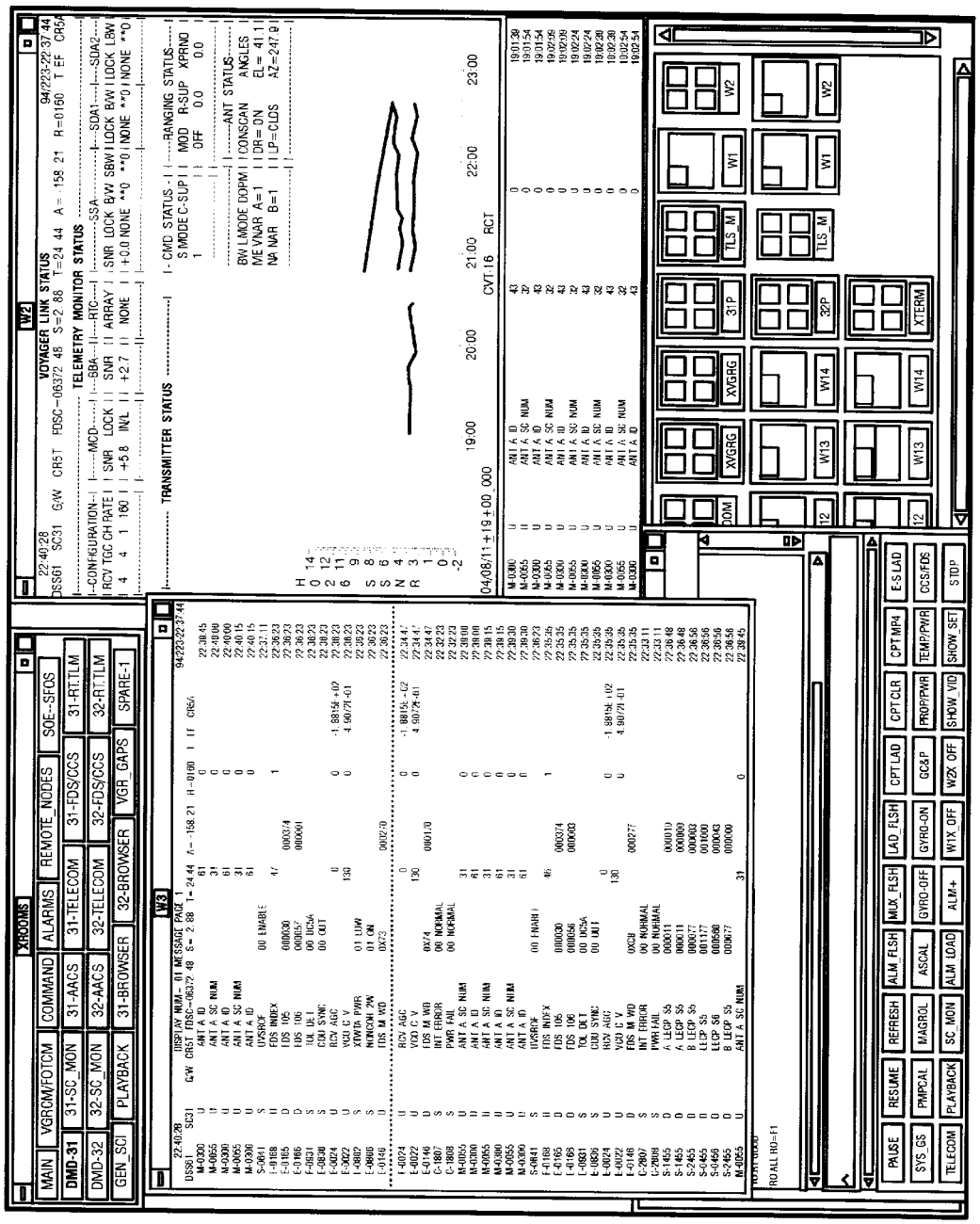
FIG. 2 is a screen display from a text-based data monitoring system.
Figure 3:
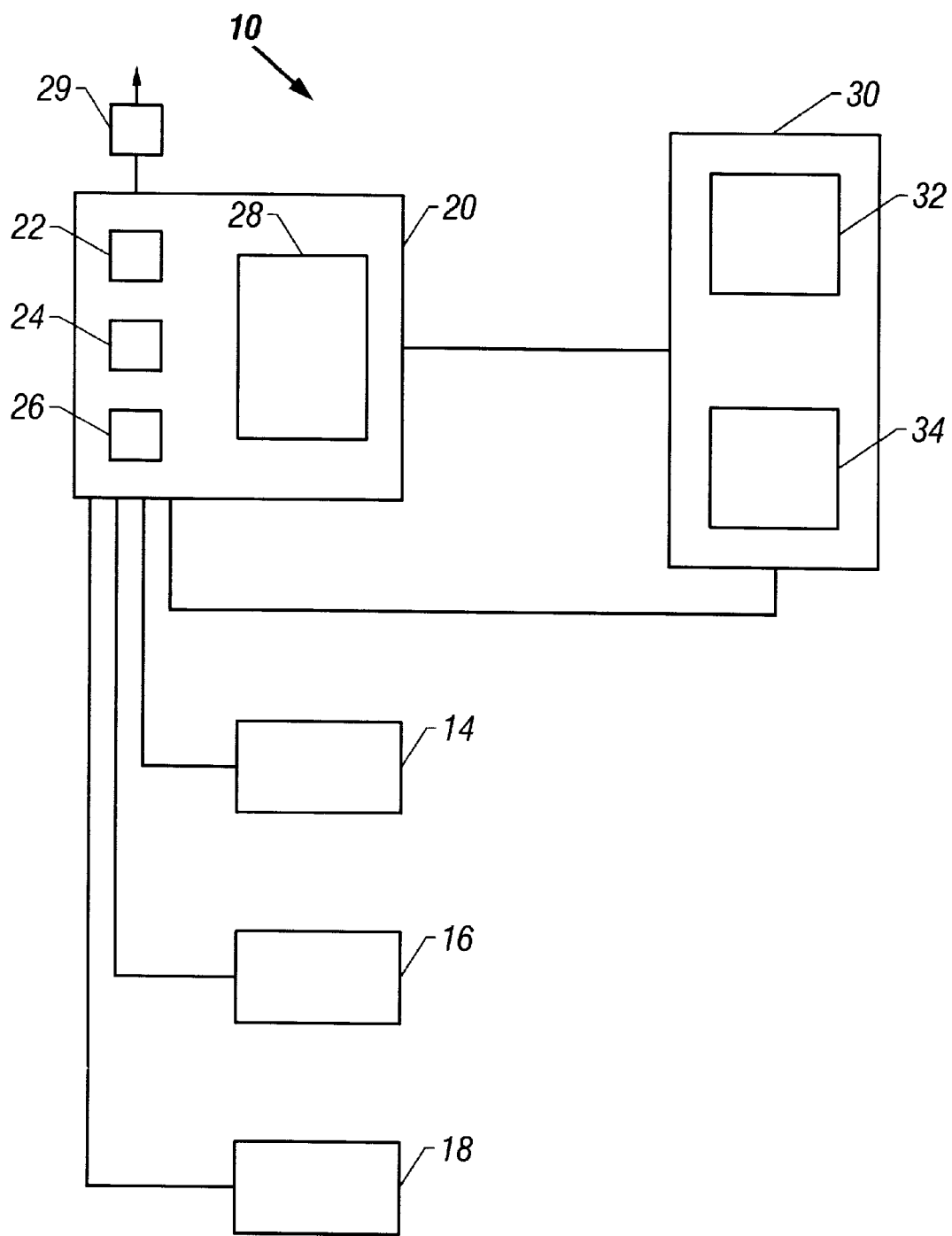
FIG. 3 is a block diagram of a preferred embodiment of the cyberspace data monitoring system of the present invention.

FIG. 3 shows a preferred embodiment of the cyberspace data monitoring system (CDMS) 10 of the present invention. The CDMS 10 has special features which facilitate monitoring and control of one or more complex monitored systems 14, 16 and 18 by an operator. The operator may be required to quickly assess the real-time status of the monitored systems 14–18 and to make appropriate decisions regarding necessary responses to the system status.

Data from the monitored systems 14–18 is processed by a conventional host computer 20 which includes a CPU 22, memory 24 and IO unit 26. Host 20 may preferably comprise a UNIX or PC workstation. The host 20 also includes a cyberspace user interface 28 which contains the necessary computer programs and/or operating systems operating to implement the techniques of the invention. A transmitting unit such as a modem 29 is optionally employed for notifying an operator of a situation by means such as paging, in addition to a visual display.

The cyberspace user interface 28 receives monitored system data under control of the CPU 22 and organizes and configures this information for display in accordance with the teachings of the present invention. In particular, the cyberspace user interface 28 controls a user interface module 30 containing a display unit such as a CRT 32 and one or more input devices (keyboard, mouse, etc.) 34. The input devices 34 are controlled by the user in response to the information on the display unit 32. This response is then transferred to the cyberspace user interface 28 for processing and modifying the display on the display unit 32. Additional information from the input devices may also include commands sent to the host 20 for control of the monitored systems 14–18.

The CDMS 10 was developed by the inventors using the C programming language and the Open GL graphics library. It was implemented on Silicon Graphics hardware, and may run on other UNIX and PC work stations. It should be understood, however, that any graphical user interface operating system could form the backbone for this system.

Figure 4:
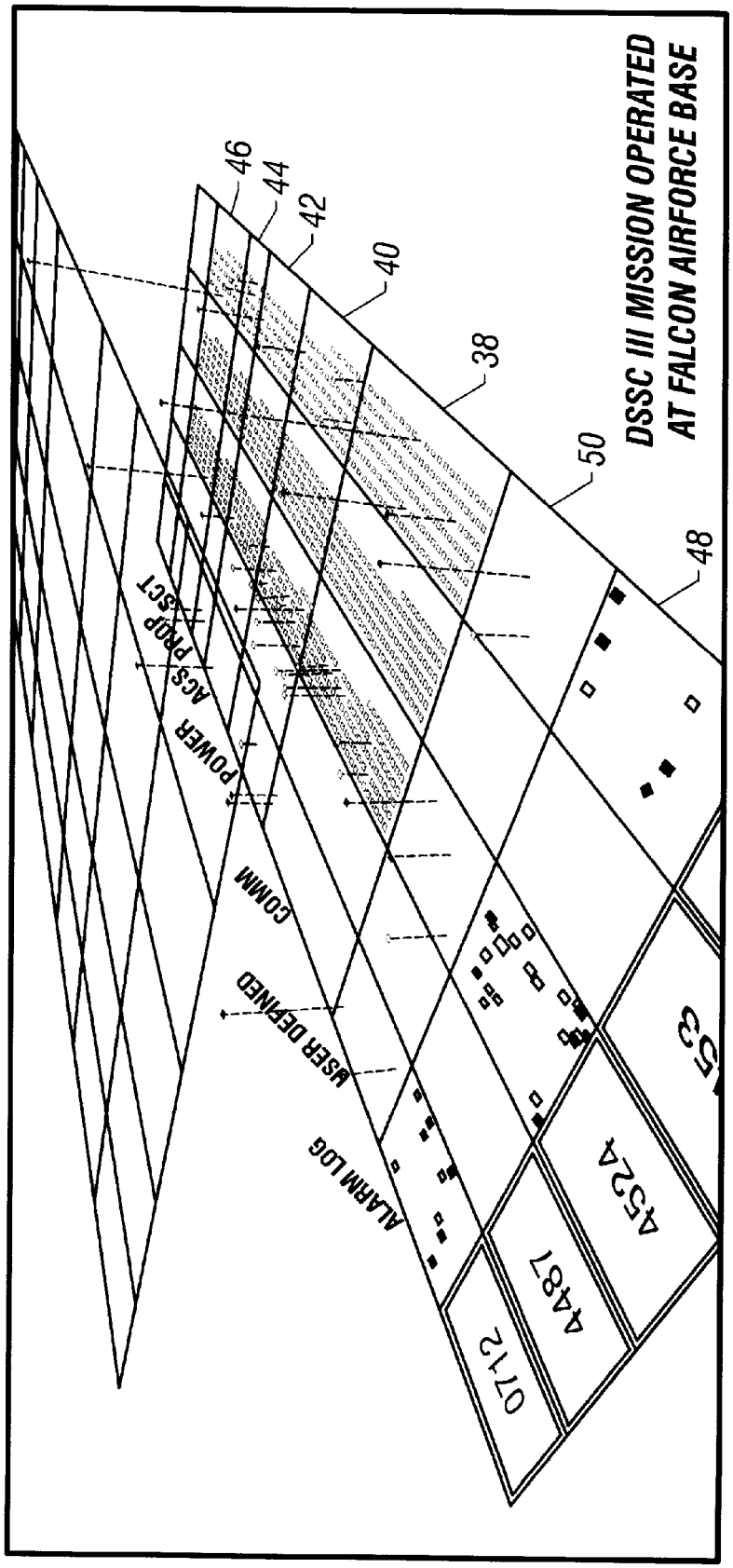
FIG. 4 is a screen display from the cyberspace data monitoring system of FIG. 3.

FIG. 4 is a screen display from the CDMS 10 in accordance with a preferred embodiment of the present invention. The invention will be described in detail using an embodiment that is adapted to the task of monitoring a plurality of spacecraft. It will be appreciated that this application is one of many in which the teachings of the present invention may be employed.

Data regarding a plurality of spacecraft missions are depicted in FIG. 4 in the form of graphic symbols or objects which are positioned within a three dimensional virtual universe. The respective dimensions of the virtual universe correspond to a variety of aspects of the spacecraft missions 36. Along a first dimension is an identification of the source of displayed data parameters, such as various spacecraft missions being monitored, labeled 0712, 4487, 4524, etc. Along a second dimension appears various user-defined categories of data parameters that are relevant of the application 38, including Communications (COMM) 38, Power 40, Attitude Control System (ACS) 42, Propulsion (PROP) 44, and SCT 46. Two additional categories that can be used in most applications are Alarm Log 48 and User-Defined 50. The alarm log records all anomalous data parameter values until they are acknowledged by the user. The user-defined grouping allows copies of data values from any combination of data parameter categories to be grouped together. A third (vertical) dimension corresponds to certain user-defined alarm limits and state values for each of the data parameter categories.

The configuration and position of the graphic symbols in FIG. 4 convey a extensive amount of information about the current state of the data parameters to the human operator 12 in an easily understandable and instantly recognizable manner, as described below.

Figure 5A:
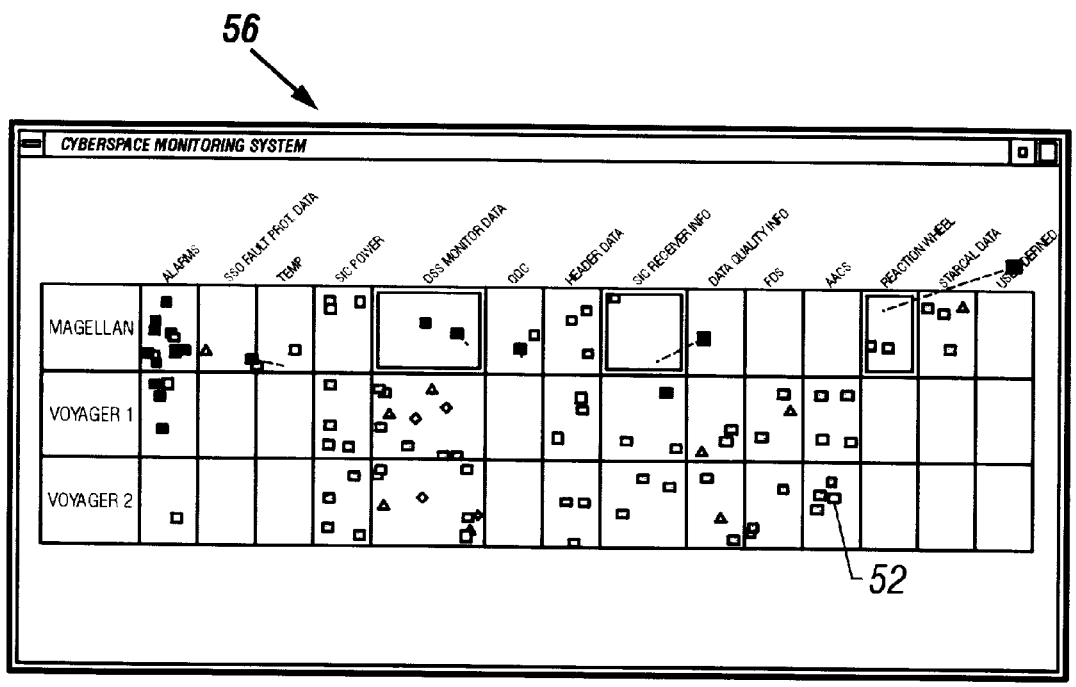
FIG. 5a is a screen display of the overview window in the cyberspace data monitoring system of the present invention.
Figure 5B:
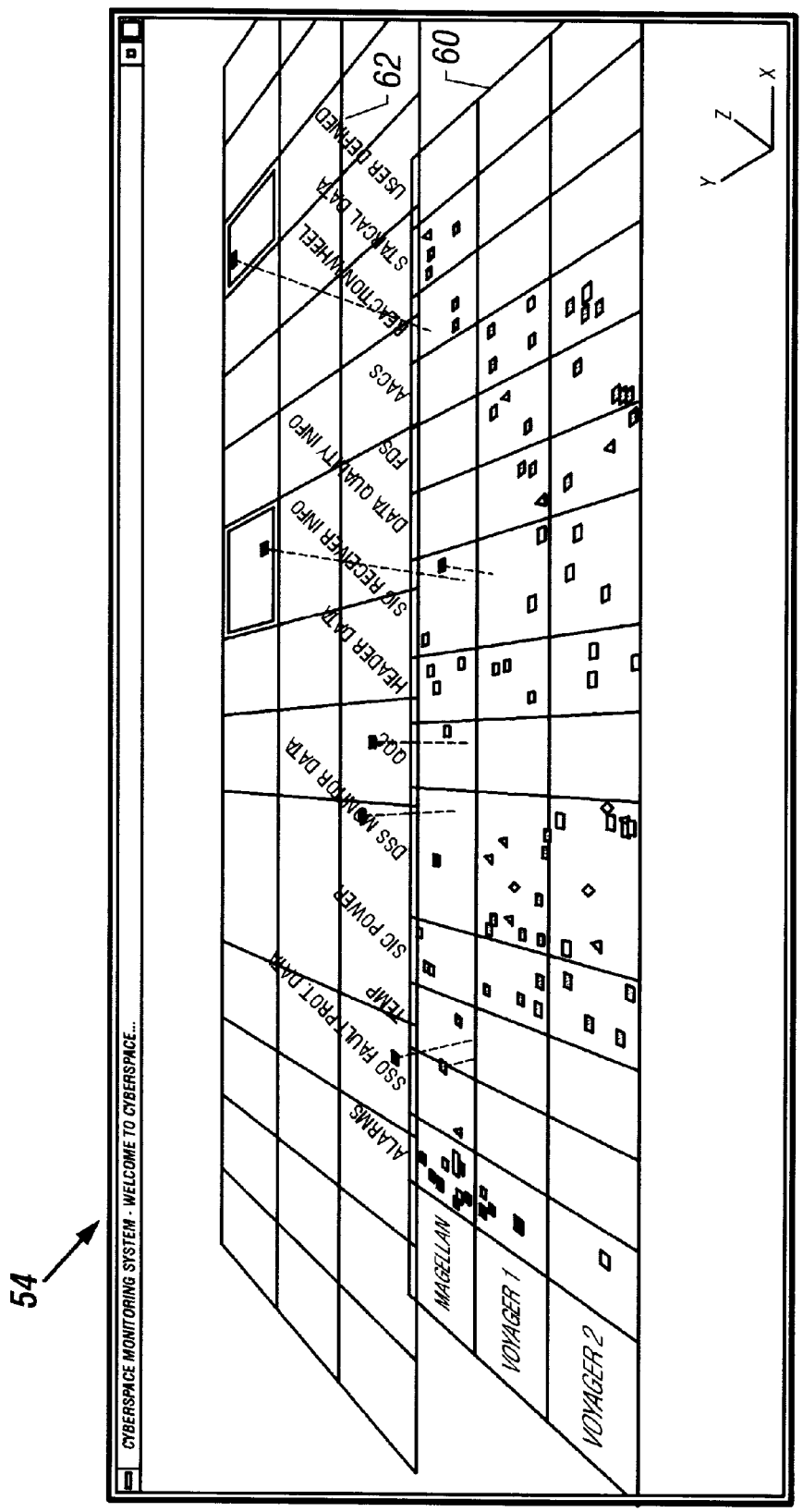
FIG. 5b is a screen display of the main window in the cyberspace data monitoring system of the present invention.

FIGS. 5a and 5b show the start-up screen of the CDMS 10 which displays two windows: an overview window 56 (FIG. 5a) and a main window 54 (FIG. 5b). The overview window provides the operator with a global view of the entire cyberspace universe. All data parameter information for the missions being monitored is visible in the overview window at all times, thus keeping the operator apprised of all alarm conditions occurring anywhere within the cyberspace universe. The overview window also allows the operator to know the location of the current viewpoint within the main window, as denoted by a green dot 52 that tells the operator, "you are here."

The main window 54 shown in FIG. 5b constitutes the primary source of information for the operator. Unlike the overview window that always displays the entire universe, the main window will typically (but not necessarily) display only a subset of the entire universe at any one time. An operator navigates through three-dimensional cyberspace using a cursor control device included in input devices 34 (such as a mouse or a trackball) to view the data from any desired viewpoint or perspective. This shifting of viewpoint is accomplished using software techniques commonly employed in computer graphics products such as computer aided design (CAD) systems. The particular viewpoint shown in FIG. 5b is a perspective view of the cyberspace universe from a position slight above and pulled back from the universe. A top orthogonal view of a representative cyberspace universe is illustrated in window 58 in FIG. 6.

The main window 54 includes a white grid 60 divided into rows and columns to form adjacent grid squares. The rows correspond to different spacecraft missions (e.g., MAGELLAN, VOYAGER 1, VOYAGER 1) and the columns correspond to user-defines data parameter categories within each mission (ALARMS, SSO FAULT PROTECTION DATA, etc.). These categories are an application specific way of categorizing the data. The white grid 60 corresponds to the baseline or nominal values of the data parameters. A green upper grid 62 is suspended above and in registration with the white grid to represent the flight approved error ceiling—i.e., the user-defined critical values for the various data parameters beyond which serious consequences, such as permanent damage to the monitored system, occurs.

The geometric objects within the white grids of the display represent individual spacecraft telemetry data parameters. Each of the data parameters has a number of attributes which are represented. For example, each of three possible shapes—rectangle, diamond, and triangle—indicate a different type of data parameter; analog, digital, and counter, respectively. Depending on the application, these and other graphical shapes may be used to indicate other attributes and qualities about the data parameter represented. The position of an object on the grid can also indicate its functional classification via adjacency to related parameters, if the user elects to group the objects within the grid square in some meaningful way. For example, objects may be grouped by type of subsystem (electrical, hydraulic, mechanical) or by physical location within the system. All data parameters are normalized to allow a diverse mix of data types and units.

While viewing the data objects, the operator may dynamically and interactively specify logical groups of parameters for monitoring. Each user-defined grouping (38–46) of parameters defines a parameter category which is delimited by a separate column in the grid. The operator may define categories through the use of configuration tables or pop-up menus. Permanent categories such as "Alarm Log" or "User-Defined" may also be implemented.

The User-Defined category 50 is a temporary collection of data parameters that the operator is likely to periodically change at various stages during the mission under consideration. One example of such a transient usage of a user-defined grouping would occur when a particular subsystem in one spacecraft (mission) fails or shows some anomaly. The operator may then want to group all data parameters relevant to the problem (even from multiple categories) and closely monitor those specific parameters for each mission in the User-Defined column. In general, anytime a given situation suggests that certain parameters demand close attention, the operator can easily place those parameters temporarily into the User-Defined column. Hence parameters which have not reached an alarm or critical state can be closely monitored during a critical period. The Alarm Log category is a redundant collection of all alarms presently occurring in the mission, without regard to particular data parameter categories.

In this interactive environment of three dimensional graphical objects in cyberspace, the operator can quickly comprehend the full range of information contained in the telemetry data by looking at combinations of shape, color, position, and behavior of geometric objects.

Anomalous data parameter states—i.e. alarm conditions—are immediately visible to the viewer through the color and behavior of the objects. Two types of alarms are employed in this embodiment of the cyberspace system: limit alarms and trend alarms. A limit alarm occurs when the value of a parameter is outside a predefined pair of high and low limits. For example, a limit alarm is activated when one of the following situations occur: (i) an analog value falls outside of its predefined nominal range; (ii) the bit state of a digital parameter does not correspond to a predefined state; or (iii) the counter value of an ASCII data parameter does not correspond to a predefined value.

Two levels of limit alarms are used: warning (preferably yellow) and critical (preferably red). FIGS. 4, 5a–b show these objects. Objects are displayed in the default color, white, to indicate that the parameter it represents is in its normal state. Objects are displayed yellow or red to indicate whether the parameter is in a warning limit alarm state (yellow), or a critical limit alarm state (red). FIGS. 4 and 5a–5b also show that during warning or critical states, the graphical object rises or elevates, to a height above the nominal grid. This height is proportional to how far the parameter has exceeded the limit. This provides a graphic indication of the severity of the alarm. The heights to which the objects rise are normalized so that the objects always remain positioned between the lower and upper grids, inclusive. At the same time that the object rises, a bar or pole extends from to object to the lower grid. This pole serves to assist the user in estimating the distance that the object has risen. Since the length of the pole is proportional to the absolute value of the data parameter.

The change in color of an object serves to increase the visibility of the alarm state. As clearly illustrated in FIG. 5a, this is very useful when viewing objects from an overhead perspective where the length of the pole below the object may be obscured. In such cases only the color is available to indicate the presence and severity of the alarm. A user can recognize that an alarm is active by an object's color, and can easily change perspective to a side view to clearly see the height of the object and associated pole.

As shown in FIGS. 4 and 5a–5b, objects in the "Alarms" category (equivalently, "Alarm Log") do not rise above the normal grid when they enter an alarm state. This is preferred because if these alarm objects were elevated as in other columns, it would produce a display that was too dense with elevated objects for a user to easily intuit meaning from height.

If the pole for a data object reaches the upper grid 62 it means that a threshold level of severity of the alarm situation has been reached; for example, it may mean that an unrecoverable error has occurred. When this happens, the color of the corresponding square in the green upper grid 62 changes from green to red. The object will remain the same color and shape but will now be encircled by a red square superimposed over that region in the green upper grid 62. This provides the operator with a dramatic indication that a system error has occurred which may need immediate attention. When a yellow object reaches the upper grid it will change to red and begin rising from the lower grid at a level proportionate to its data parameter value.

Rather than depending on the current value of a data parameter, a trend alarm is based on the rate of change in a parameter value over time that indicates some kind of pattern. If the rate of change of a parameter exceeds some predefined limit over a predefined period of time, then the CDMS 10 triggers a trend alarm for that parameter. A trend alarm may be triggered when a data value steadily increases or decreases during a specified time range. Or, the trend alarm may be triggered when the rate of change for a data parameter has exceeded a predefined limit. For example, if a fire starts in a spacecraft a temperature sensor may show an unusually rapid increase in temperature. This rapid rate of increase will likely trigger a trend alarm well before the temperature value reaches an alarm level. This gives extra time to respond to the fire and mitigate the damage.

The CDMS 10 currently uses two different techniques for detecting trend alarms. The first trending technique tracks the continual increase or decrease of the data parameter value over a user specified time interval in which a warning or critical alarm will occur. For example, a user may specify (in the mission database) that a critical alarm should occur if spacecraft cabin pressure decreases for more than 8 seconds, because this may indicate a cabin leak as opposed to normal pressure fluctuations.

The second trend alarm involves tracking the rate of change over time: if the rate change of a parameter exceeds some predefined limit over a specified period of time, then the parameter triggers a trend alarm. For example, a rapid non-transitory drop in a battery voltage may suggest a short circuit rather than normal electrical loads. Depending on the system's objectives, a variety of other trending techniques may also be used. The CMDS 10 performs trend analysis in real-time.

Both of these types of trend alarms can assume one of two levels of severity, each of which is represented through a unique data abstraction. If the CDMS 10 determines that the trend alarm is less severe (a "warning level" trend alarm), the graphical object associated with that parameter will appear to spin on the screen display. If the alarm is more severe (a "critical level" trend alarm), the object will repeatedly flash between different levels of brightness.

In any given spacecraft mission, a particular data parameter may experience a limit alarm and a trend alarm concurrently. As noted above, a limit alarm and a trend alarm may each occur in one of two severities—a limit alarm may be either warning level (yellow) or critical level (red) and a trend alarm may be either warning level (spinning) or critical level (flashing). A preferred embodiment of the CDMS 10 employs the unique combinations of graphical techniques identified in Table I to represent each of nine potential combinations of alarm states.

TABLE I

|  | No Trend Alarm | Warning Trend Alarm | Critical Trend Alarm |
| --- | --- | --- | --- |
| No Limit Alarm | white not spinning not flashing | brown spinning not flashing | brown not spinning flashing |
| Warning Limit Alarm | yellow not spinning not flashing | yellow spinning not flashing | yellow not spinning flashing |
| Critical Limit Alarm | red not spinning not flashing | red spinning not flashing | red not spinning flashing |

If a trend alarm occurs while the object already is in a limit alarm state, the color of the object remains the same as for the existing limit alarm (i.e., either red or yellow). If, on the other hand, the object is not in a limit alarm state, it turns from its nominal white color to brown when only a trend alarm is triggered. Hence a brown object immediately tells the user that a trend alarm, but no limit alarm, is active. This use of color, spinning, and flashing makes possible the unambiguous display of all possible combinations of limit and trend alarms in a single object.

Operators familiar with the CMDS 10 will be able to immediately assess which of the 9 different conditions exist for each parameter. As demonstrated by FIG. 4, several hundred data parameters are easily visible at the same time. This means that the operator can quickly assess thousands of possible conditions at a glance. Also, more serious conditions receive more prominent displays.

Furthermore, as indicated by FIG. 4, more distant grid lines converge into a distant virtual background space. This compresses the more distant data representations into a smaller portion of the screen space. Regardless of the user viewpoint, when moving through this virtual space, the data of greater interest is displayed closer and larger than data of lesser interest which is displayed smaller and farther away. This distance can continue indefinitely without any theoretical limit. Hence, at extreme virtual distances objects in the background will be so small that the user may not be able to ascertain much more than the existence of an alarm status. The user will then need to move his virtual viewpoint much closer in order to determine exactly which parameter is in an alarm state.

By shrinking less relevant data representations, the user is able to effect a continuously variable choice of how much detail of the various regions of data are displayed at a given moment. At the same time, the user can maintain an overall view of the entire data field. Since there is no theoretical limit on how far the grids and objects may extend into the virtual distance, the present invention makes it possible to monitor a seemingly limitless amount of data at a given time. For example, upper and lower grids 60 and 62 can extend indefinitely in all directions into virtual space. Multiple sets, or arrays, of such grids can be displayed on a single screen as viewed from a very large virtual distance. To effectively monitor such extremely fine-grained displays may require increasing the visibility of the representation of alarm states because such distant objects will be extremely small. In contrast, prior display and monitoring systems do not provide this intuitive and qualitative display of such potentially large amounts of data and would require much more screen space and multiple screens to communicate this much information.

Figure 7:
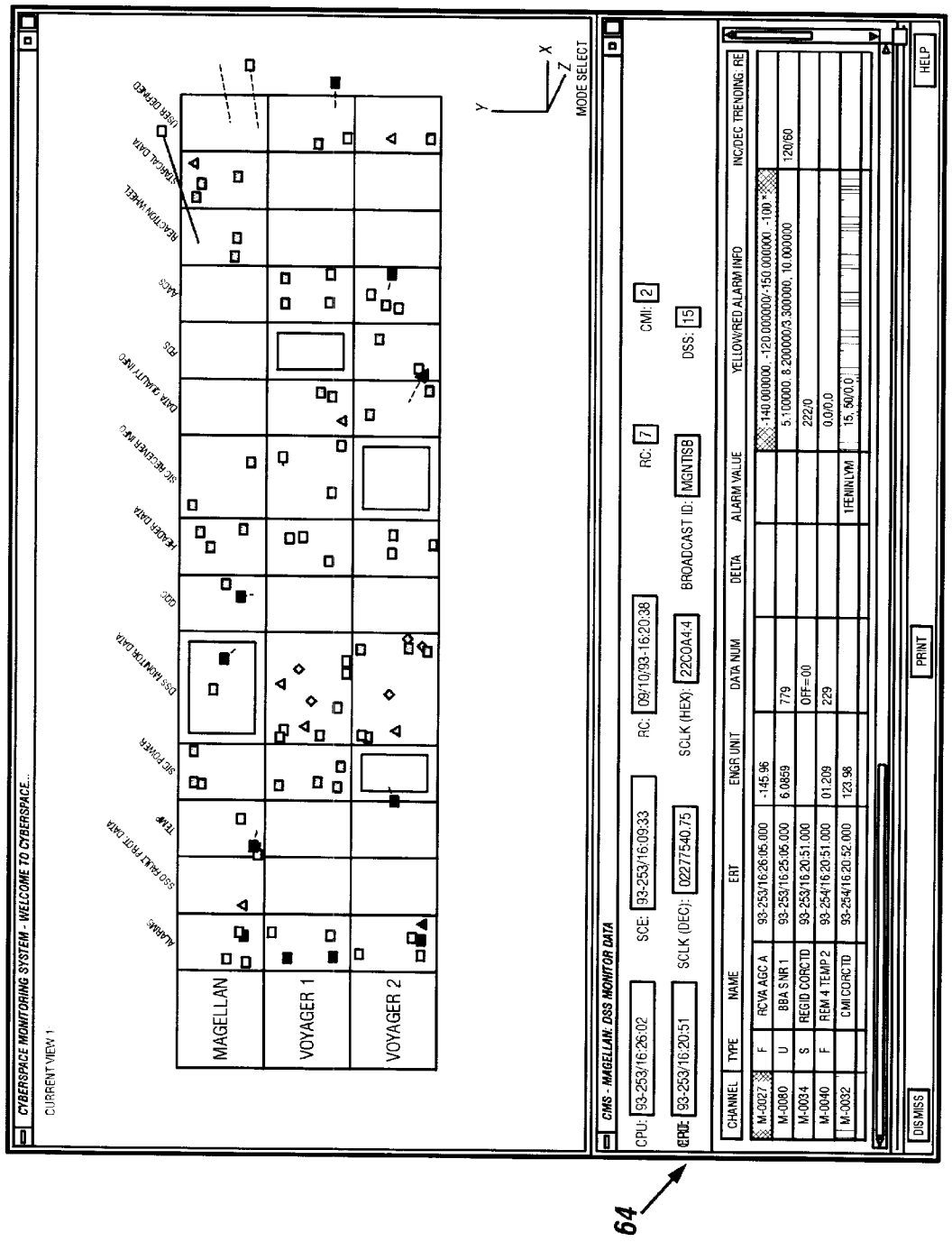
FIG. 7 is a screen display from the cyberspace data monitoring system of the present invention.

An operator may learn additional information about parameters that are in alarm (i.e., beyond the information that is already graphically represented) by clicking on the data object of interest. This action causes a pop-up window 64 to appear below the main window as shown in FIG. 7. The pop-up window contains text information concerning the chosen parameter and all other parameters contained within the same parameter category. As shown in the more detailed view of the pop up window 64 in FIG. 8, each row corresponds to a data parameter. Detailed information includes the data parameter mnemonic, data type, description, time of receipt, floating point value, data value as received, and alarm limits. Of this information, only a limited amount of information (such as data type, data value and alarm limits) can be obtained from the 3D display 54; and this information is represented qualitatively rather than quantitatively. The detailed numeric information is only needed in unusual circumstances and therefore is not included in the 3D display 54.

Some of the information in the pop up window 64 is similar to what has been traditionally available in text-based displays: parameter name, time of last update, engineering unit value or data number, and type of alarm. Other information available in the pop up window 64 relates to new types of alarms associated with various types of trend analysis. Still further information such as the warning and critical limits of the trend algorithms may be available in the pop-up window 64. Text-bound displays would require an operator to view a different screen for each of possible several hundred objects to glean the equivalent information that is available at a glance using the CDMS 10.

Figure 6:
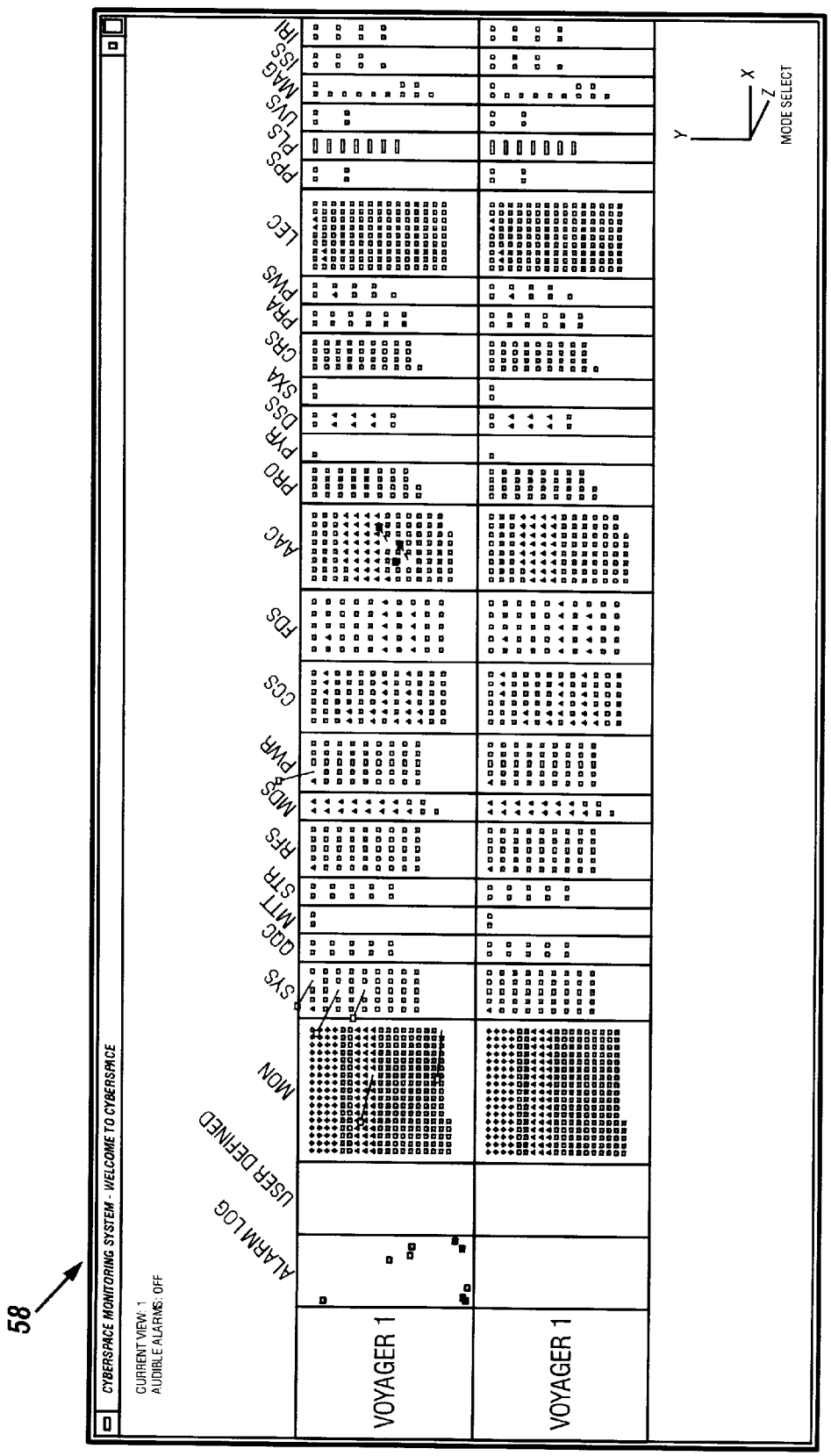
FIG. 6 is a screen display from the cyberspace data monitoring system of the present invention.

The default amount of information that is displayed in both the graphic windows (i.e., the main 54 and overview 56 windows) and in the pop up text windows 64 is user-selectable based on operator expertise and preferences. The default configuration can be dynamically adjusted by the operator during monitoring operations to reflect changing needs. As shown in FIG. 6, for example, the operator may configure the system to display only two of the three potentially available missions or to add a desired number of additional missions. Configuring the display involves deleting or adding mission database to or from the data directory.

Figure 9:
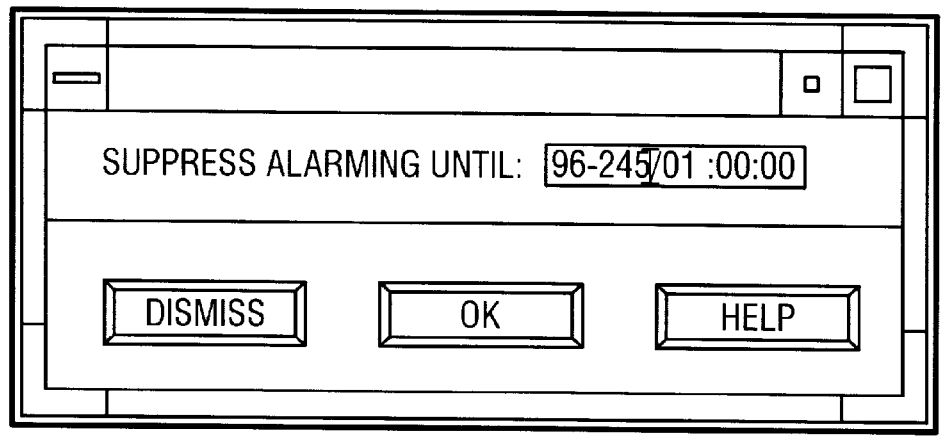
FIG. 9 is a screen display of the alarm suppression facility of the present invention.
Figure 10:
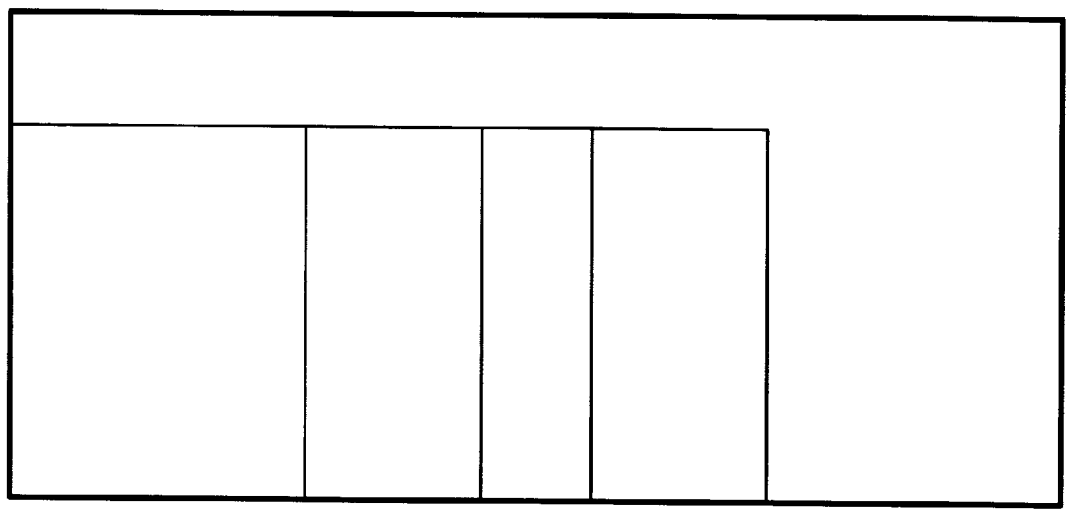
FIG. 10 is a screen display of a suppressed object in accordance with the present invention.

The CDMS 10 also may be used for off-line for non-real-time analysis. Historical data files can be replayed and trend data that has been saved to a database can be displayed. Other features (available in real-time or non real-time mode) allow the display of conventional plots or trend data, suppression of nominal parameter values, suppression of alarm notification for user-specified time intervals, and movement of data objects to any grid-square location chosen by the operator. Suppression of alarms can be done by clicking on the desired data parameter and entering a time unit the suppression is deactivated (as shown in FIG. 9). The suppression of the object is conveyed visually (as shown in FIG. 10) by turning the object blue. The system automatically detects when the time expires and turns the object back to its original state. This feature can be used for data parameters which are known by the operator or analyst to be anomalous. Organization of data parameters is achieved by selecting the object to move and clicking on the desired area in the grid square where the object will be placed.

The highly visual look and feel of the CDMS 10 may be complemented with the use of speech output to communicate key alarm and parameter identification information to the operator without requiring the reading of text or the viewing of graphic objects. A high-quality audio system is preferably used to digitize and edit key words and phrases. When an operator clicks on an object representing a data parameter or when an alarm occurs, the CDMS 10 joins appropriate words and phrases to deliver a voice alarm (i.e., a spoken message) to the operator indicating the identity of the parameter, the type of alarm (trend or limit) and its severity. When whole words are digitized the resulting speech has a smooth and natural sound. If a more flexible vocabulary is required other speech synthesis methods such as phoneme-based speech synthesis may be used. When a particular data parameter (e.g., E-1234) is in a warning state, the system may say "Parameter E-1234 is in warning." To alert the operator of multiple alarms, the system may say "Four critical alarms have been detected," thereby informing the operator of the number and severity of alarms occurring.

The CDMS 10 also may be enhanced by providing a speech recognition capability. Efficient pattern matching algorithms can be used to accurately identify commands spoken by the operator. Standard techniques may be used in which the operator's speech is filtered into frequency bands that are further subdivided and compared with previously digitized samples used to "train" the software.

Other features which may be used in other embodiments of the CDMS 10 include the following:

(i) The system may be configured to automatically dial the operator's telephone pager number by means of a modem 29 whenever an alarm condition occurs, thus informing the operator that the monitoring system requires attention. As a result, the operator need not be physically present at the monitoring system site at all times. Any standard telephone paging device will suffice for this purpose. The paging feature may be enabled by entering the pager number into a text-field of the parameter table.

(ii) The system may employ plotting capabilities which may be used to plot data parameter objects against real time, historical averages; and summary data, such as, minimum, mean, maximum, standard deviation, etc. The operator may enable plotting through a point-and-click menu. Any conventional plotting hardware may be used.

(iii) Output data from the system may be printed in either ASCII or Postscript format.

(iv) The system may provide an extensive and user-friendly on-line help system that guides the operator in a clear and succinct step by step format. This may be implemented using a hypertext browser such as the one employed in NETSCAPE.

The implementation of cyberspace representation is highly generic—that is, it is applicable to a wide variety of applications in which varying data is monitored. This enables it to be used for a wide variety of simultaneous data streams and/or missions. Other applications include sensor data from industrial plants, time varying financial data (i.e., stock or securities prices), monitored medical data i.e., blood pressure, heart rate, etc., from large numbers of intensive care patients or other hospital patients). In addition, the cyberspace architecture enables the various modules that comprise the system to be distributed over a network, if desired.

Figure 11:
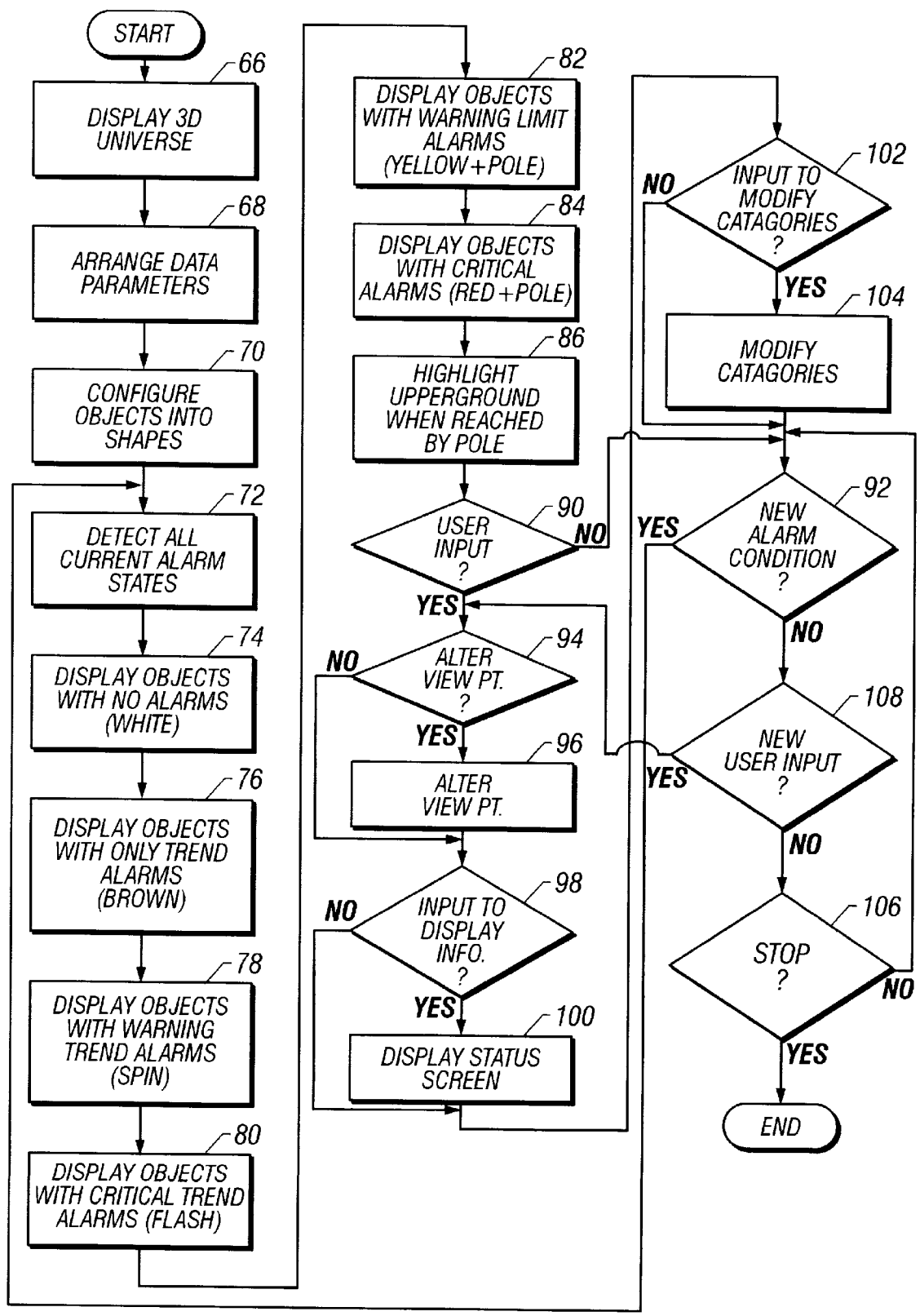
FIG. 11 is a flowchart of the method of one embodiment of the invention.

FIG. 11 shows a flowchart of a preferred embodiment of the method of the cyberspace data monitoring system of the present invention. The process of the invention begins with the generating of a display of a three-dimensional cyberspace universe including upper and lower grids as shown in block 66. Next, in block 68 objects representing data parameters are arranged in predetermined locations based on data categories in the lower grid. The system configures each object in a predefined geometric shape based on data parameter type. As shown in block 72, the system determines all current object alarm states. As shown in block 74, the system displays all objects with no alarm states in the color white. The system displays objects with only trend alarms active in the color brown, as shown in block 76. All objects with a warning trend alarm are displayed spinning, as shown in block 78. The system then displays all objects with critical alarm trends flashing, as shown in block 80. All objects with warning limit alarms are displayed yellow and elevated to a proportional amount by a yellow pole as in block 82. All objects with critical alarm limits are colored red and displayed elevated to a proportional level by a red pole as in block 84.

As shown in block 86, when a critical alarm reaches a highly severe state, as indicated by reaching the level of the upper grid, the upper grid square encircling the object is highlighted in red. In decision block 90 the system determines whether a user input is present. If so, the system determines, if this user input is a request to modify the viewpoint, as shown in decision block 94. If not, decision block 90 directs the process to decision block 92. If the user input is a request to modify the viewpoint, the viewpoint is altered in a manner which expands approaching regions and shrinks receding regions of the display proportionately. If a user input to modify the viewpoint is not present, as determined in decision block 94, the process proceeds to decision block 98. Also, once the process completes the step shown in block 96, the process proceeds to decision block 98, where it is determined whether an input is received to display more information regarding an object. If so, the status screen 56 is displayed, as shown in block 100. If not, the process proceeds to decision block 102, which is reached also after decision block 100 is performed.

Decision block 102 shows the step of determining whether a user input is a request to modify user-defined categories. If so, the objects requested are rearranged into the user-defined category in step 104. The process then proceeds to block 92; this is also the destination if decision block 102 determined there was no input to modify the user-defined category. Block 92 determines whether a new alarm condition exists anywhere in the display and, if so, directs the process back to step 72 to update all of the alarm conditions. If not, the process proceeds to block 106 where it is determined whether there is a new user input. If so, the process proceeds back to block 94 to process this user input. Otherwise, the process proceeds to block 106 where it is determined whether there is a stop command, and if not, the process returns to decision block 92. If there is a stop command the process ends.

The invention includes various computer programs implementing the techniques of the present invention. Some of these functions may be implemented in hardware or software, or a combination of both. However, preferably, the invention is implemented in computer programs executing on programmable computers such as host computer 20 shown in FIG. 3. Program code is applied to input data to perform the functions described herein and generate output information. The output information is applied to one or more output devices such as the display unit 32, in known fashion.

Each program is preferably implemented in a high level procedural or object oriented programming language to communicate with a computer system. However, the programs can be implemented in assembly or machine language, if desired. In any case, the language may be compiled or interpreted language.

Each such computer program is preferably stored on storage media or device (e.g. ROM or magnetic diskette), readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Although the invention has been described in detail, it should be understood that various changes, substitutions and alterations can be made without departing from the teachings thereof. For example, two-dimensional planes and landmarks may be represented by ways other than grids, such as by solid objects. More than two grids may be employed, and many different shapes, colors and movements, may be used to represent data, data trends and data conditions.

All such modifications are intended to be encompassed within the following claims.

What is claimed is:

1. A method for monitoring multiple systems comprising:
    receiving data from a plurality of monitored sources, the data including a plurality of data parameters, including both fixed and dynamic attributes;
    for each of said data parameters, determining a specific nominal range of values which are specific to and associated with each specific data parameter, and which nominal range of values represents a value that its associated data parameter should have during normal operation, and also defining a specific alarm value, which is specific to and associated with said each data parameter and which alarm value represents a value that indicates unusual behavior in the associated data;
    graphically representing said attributes by symbolic graphical representations that include symbolic shapes and colors, said shapes and colors each representing an attribute of each data parameter;
    arranging said symbolic graphical representations in a simulated three-dimensional space in locations that symbolize particular attributes,
    using the height of each object to represent a percentage value by which said parameter differs from said associated range of nominal values that is associated with said each data parameter, and by which said parameter approaches said associated alarm value that is associated with said each data parameter, such that said each object is displayed without height when within said associated nominal range, and displayed to have a height when a value of the parameter is outside said nominal range, wherein taller objects indicate a greater severity of alarm, and shorter objects represent lesser severity of alarm;
    displaying said simulated three-dimensional spatial environment in a perspective view; and
    simulating movement of the perspective view in response to user input.

2. A method according to claim 1 further comprising modifying locations during said displaying so as to temporarily group together different graphical objects of interest.

3. A method according to claim 1 wherein said three-dimensional representation includes a representation of one or more horizontal planes upon which said objects are virtually disposed.

4. A method according to claim 1 further comprising continually modifying the graphical objects in response to changes in a value of the data parameter.

5. A method according to claim 1 further comprising displaying the objects in a particular shape based on the type of data represented thereby.

6. A method according to claim 1 further comprising displaying additional data parameters for a selected graphical object in response to an input from a human operator.

7. A method according to claim 1 further comprising transmitting a signal to said operator in response to a state value exceeding a threshold.

8. A method according to claim 1 wherein said source of data parameters is a spacecraft.

9. A method according to claim 1 wherein said plurality of data parameters include data sources, data categories and data values.

10. A method according to claim 9 further comprising modifying, in response to a human operator input, one of said data parameter categories to contain a set of graphical objects from different data parameter categories as specified by the operator input, whereby said operator can view a new grouping of graphic objects of transitory interest.

11. A method according to claim 1 further comprising modifying the color of the objects to a first color in response to a parameter value reaching said alarm value that is associated with said parameter value.

12. A method according to claim 11 further comprising defining a second alarm value, more severe than the alarm value and also associated with the specific parameter value, and modifying the color of the objects to a second color in response to a parameter value reaching said second alarm value that is associated therewith.

13. A method according to claim 1 further comprising monitoring a value of a variable being monitored over time;
- determining a rate of change of said value of said variable overtime;
- determining if said rate of change of said value of said variable is greater than a predefined limit;
- defining a rate of change alarm when said rate of change of said value of said variable is greater than said limit; and
- causing the appearance of the objects to be changed when said alarm is defined.

14. A method according to claim 13 further comprising causing the displayed object to appear to spin in response to the rate of changed of said value of said variable exceeding a threshold.

15. A method according to claim 14 further comprising causing the appearance of the objects to change in intensity periodically in response to the change of a parameter value exceeding a change duration threshold.

16. An apparatus for monitoring a plurality of systems, comprising:
- a plurality of monitored systems, each generating data parameters;
- a processor coupled to each of said monitored systems;
- a visual display device coupled to the processor and displaying representations of said data parameters to users;
- a user interface, transmitting signals to the processor in response to user input;
- said processor operating to:
  - for each of said data parameters, determine a specific nominal range of values which is specific to and associated with each specific data parameter, and which nominal range of values represents a values that its associated data parameter should have during normal operation;
  - for each of said data parameters, also determine a specific alarm value, which is specific to and associated with said each data parameter and which alarm value represents a value that indicates unusual behavior in the associated data;
  - receive data from a plurality of monitored sources, the data including a plurality of data parameters;
  - graphically represent said attributes by symbolic graphical representations that include symbolic shapes and colors, each of which represents attributes of each data parameter;
  - arrange said symbolic graphical representations in a simulated three-dimensional space in locations that symbolize particular attributes, wherein the height of said objects: 1) is zero when said value is anywhere within said nominal range, and 2) to have a height that represents a percentage value by which a parameter represented by said object exceeds said nominal range associated with the specific parameter value, and a percentage value by which said parameter approaches said alarm value associated with the specific parameter value, such that taller objects indicate a more severe deviation from said nominal range towards alarm, and shorter objects represent a less severe deviation from nominal;
  - display a simulated three-dimensional spatial environment in a perspective view with fixed portions; and
  - simulate in response to user input, the viewpoints that result from simulated motion of said user from said foreground location to a desired background location.

17. An apparatus according to claim 16 wherein said processor also operates to modify locations during said displaying so as to temporarily group together different graphical objects of interest.

18. An apparatus according to claim 16 wherein said three-dimensional representation includes a representation of one or more horizontal planes upon which said objects are virtually disposed.

19. An apparatus according to claim 16, said processor operating to continually modify the graphical objects in response to changes in a value of the data parameter.

20. An apparatus according to claim 16 said processor operating to display the objects in a particular shape based on the type of data represented thereby.

21. An apparatus according to claim 16, said processor further operating to display additional data parameters for a selected graphical object in response to an input from a human operator.

22. An apparatus according to claim 16, said processor operating to transmit a signal to said operator in response to a state value exceeding a threshold.

23. An apparatus according to claim 16 wherein said source of data parameters is a spacecraft.

24. An apparatus according to claim 16 wherein said plurality of data parameters include data sources, data categories and data values.

25. An apparatus according to claim 24 said processor operating to modify, in response to a human operator input, one of said data parameter categories to contain a set of graphical objects from different data parameter categories as specified by the operator input, whereby said operator can view a new grouping of graphic objects of transitory interest.

26. An apparatus according to claim 16, said processor operating to modify the color of the objects to a first color in response to a parameter value reaching said alarm value.

27. An apparatus according to claim 26 further comprising defining a second alarm limit for specific parameters, each said second alarm limit being specifically associated with an associated parameter, said processor operating to modify the color of the objects to a second color, in response to a parameter value reaching said second alarm limit that is associated therewith.

28. An apparatus according to claim 16, said processor operating to monitor a value of a variable being monitored over time;
- determine an amount of change of said value of said variable over time;
- determine if said amount of change of said value of said variable over time is greater than a predefined limit, independent of an actual value of said variable; and
- cause the appearance of the objects to be changed based on the relationship of the amount of change to said limit.

29. An apparatus according to claim 28 wherein said amount of change is a rate of change, and said processor operating to cause the appearance of the displayed objects to change in response to the rate of change of a parameter value exceeding a threshold.

30. An apparatus according to claim 28, wherein said amount of change is a change occurring in a predetermined direction, which is one of continuous increment or continuous decrement for a predetermined period exceeding a change duration threshold.

31. A method for monitoring data comprising:

graphically representing three-dimensional virtual space from a changeable perspective viewpoint;

defining a graphical representation of a plurality of attributes of a plurality of data parameters, said attributes including multiple types of values including at least digital values and analog values, by spatial configurations and locations in said three-dimensional virtual space;

defining at least one range of nominal values individually associated for each of said parameters;

for at least a first plurality of parameters, defining a limit alarm value which is individually-associated with each of said first plurality of parameters for each of a second plurality of parameters, defining a trend value, which is individually assigned for said each parameter, said trend value representing that a rate of change of value of a parameter which suggests that an error will occur in the future, but has not yet occurred;

monitoring a degree to which each said parameters deviate from said nominal ranges associated with said each parameters, including, for said first parameter, monitoring a degree to which said first parameter exceeds said nominal range, and for said second value, determining an amount of change of said variable over time and determining a degree to which said amount of change of said parameters exceeds said nominal range and wherein said alarm value for said second parameter indicates a likely fault associated with a value associated with said parameter, before said fault actually occurs;

displaying a plurality of graphical objects with said defined spatial configuration and locations such that each graphical object represents said plurality of attributes of one of said data parameters and such that the height of said objects represent said degree to which said parameter represented by said object deviates from said nominal range and approaches said alarm value, such that objects which are within said range are displayed with no height, and objects which are outside the nominal range are displayed with a height that is proportional to the degree of the alarm, such that taller objects indicate a more severe deviation from nominal that can be viewed from a longer distance away, and shorter objects represent less severe deviations from nominal; and modifying said perspective viewpoint, by enlarging regions of said virtual space, and objects within said regions that approach the viewpoint and by shrinking regions of said virtual space and objects within said regions, that recede from the viewpoint in said virtual space.

32. A program as in claim 31, wherein said trend is based on a rate of change of said parameter being monitored.

33. A program as in claim 31, wherein said trend is based on continuous increment or decrement of said parameter for a specified period.

34. A program as in claim 31, wherein said shapes represent a kind of alarm.

35. A program as in claim 34, wherein a first shape represents a limit alarm and a second shape indicates a trend alarm.

36. A computer program, residing on a computer-readable medium for graphically representing information, the computer program comprising instructions for a causing a computer to:

for each of a plurality of data parameters, determining a specific nominal range which is specific to and associated with each specific data parameter, and which nominal range represents values that its associated data parameter should have during normal operation, and also defining a specific alarm value, which is specific to and associated with said each data parameter and which alarm value represents a value that indicates abnormal behavior in the associated data;

graphically represent said data parameters by symbolic graphical objects that include both fixed and dynamic attributes of each data parameter;

arrange said symbolic graphical objects in a simulated three-dimensional space in locations that symbolize particular attributes, wherein the height of said objects represent a percentage value by which each parameter represented by said object exceeds said nominal range associated with said each parameter and a percentage value by which said each parameter approaches said alarm value associated with said each parameter, such that taller objects indicate a more severe deviation from the nominal range individually associated therewith, and shorter objects represent less severe deviation from nominal range individually associated therewith, independent of units of said parameter represented by said objects;

display said simulated three-dimensional spatial environment in a perspective view with fixed landmarks being symbolic of said attributes, the perspective view displaying selected landmarks in the foreground and selected landmarks extending into virtual background of the three-dimensional space and such that said more severe alarms are visible from a longer distance away; and simulate, in response to user input, the resulting viewpoints that result from simulated motion of said user from said foreground location to a desired background location, wherein said size and spatial relationships of said landmarks in the viewpoint continuously change until said desired background location is in the foreground of the viewpoint.

37. A program as in claim 36, wherein colors and shapes of said objects represent a category of a specific data parameter.

38. A method for monitoring multiple systems comprising:

receiving data from a plurality of monitored sources, the data including a plurality of data parameters including a plurality of data attributes, each parameter having a plurality of represented attributes;

for each of said data parameters, determining a specific nominal range which is specific to and associated with each specific data parameter, and which nominal range represents a range of values that its associated data parameter should have during normal operation and also defining a specific alarm value, which is specific to and associated with said each data parameter and which alarm value represents a value that indicates unusual behavior in the associated data;

graphically representing said parameters by symbolic graphical representations, said graphically representing comprising:

for each data parameter, displaying at least a first plane indicating said nominal range associated with said each parameter, where a value anywhere within said normal range and a second plane indicating an alarm value for said each parameter, and displaying said parameters showing a height, where said height is zero when said value is within the nominal range, is and has a height that is indicative of the percentage value by which said parameter exceeds said nominal range and approaches said alarm value that is associated with said each parameter, and at least one of the shape and color representing a category of the parameter;

arranging said symbolic graphical representations in a simulated three-dimensional space in locations that symbolize particular attributes, wherein the height, shape and color of each object each convey different information about the represented data parameter;

displaying said simulated three-dimensional spatial environment in a perspective view with landmarks being symbolic of said attributes, the perspective view displaying selected landmarks in the foreground and selected landmarks extending into virtual background of the three-dimensional space; and simulating, in response to user input, viewpoints that result from simulated motion of said user from said foreground location to a desired background location, wherein said size and spatial relationships of said landmarks in the viewpoint continuously change until said desired background location is in the foreground of the viewpoint;

determining an amount of time that a first of said data parameters has one of increased continuously, or decreased continuously; and indicating an alarm value for said first parameter which indicates a trend alarm value which indicates a time of continual increase or decrease of said parameter which is high enough to indicate a likely alarm condition in the future, but which has not yet occurred.

\* \* \* \* \*